United States Patent

Berendse et al.

[11] Patent Number: 5,914,386
[45] Date of Patent: Jun. 22, 1999

[54] COPOLYESTER ELASTOMER

[75] Inventors: Henk W. Berendse, Arnhem; Gerard H. Werumeus Buning, Schinnen; Christiaan Schroder, Geleen, all of Netherlands

[73] Assignee: DSM N.V., Heerlen, Netherlands

[21] Appl. No.: 08/985,917

[22] Filed: Dec. 8, 1997

[30] Foreign Application Priority Data

Dec. 6, 1996 [BE] Belgium ................................ 9601020

[51] Int. Cl.$^6$ ................................................... C08G 64/00
[52] U.S. Cl. .............................. 528/272; 525/89; 525/90; 525/92; 525/176; 525/177; 525/408; 525/446; 528/176; 528/196; 528/271
[58] Field of Search ..................................... 528/176, 196, 528/271, 272; 525/89, 90, 92, 176, 177, 408, 446

[56] References Cited

U.S. PATENT DOCUMENTS

| | | | |
|---|---|---|---|
| 4,465,793 | 8/1984 | Brennan et al. | 521/172 |
| 4,468,483 | 8/1984 | Yeakey et al. | 521/172 |
| 4,483,970 | 11/1984 | Huntjens et al. | 525/440 |
| 5,550,190 | 8/1996 | Hasegawa et al. | 525/92 |

*Primary Examiner*—Terressa Mosley
*Attorney, Agent, or Firm*—Pillsbury Madison & Sutro

[57] ABSTRACT

The invention relates to a novel copolyester elastomer essentially made up of A: hard polyester segments made up of repeating units derived from an aliphatic diol and an aromatic dicarboxylic acid and B: soft polyester segments made up of repeating units derived from B1: an aliphatic carbonate and, if desired, up to 60% by weight of B, B2: an aliphatic diol and an aliphatic dicarboxylic acid or B3: a lactone, said hard and soft segments being bonded via ester bonds to form copolyesterester units and said copolyesterester units being connected to one another by a urethane group.

The novel copolyester elastomer has an exceptionally high thermo-oxidative resistance and resistance to hydrolysis and is used, inter alia, in bellows, seals, pipes, hoses and cable sheathings.

21 Claims, No Drawings

COPOLYESTER ELASTOMER

FIELD OF THE INVENTION

The invention relates to a thermoplastic copolyester elastomer having a combination of both very good mechanical properties and a very good thermal stability and resistance to hydrolysis. Thermoplastic copolyester elastomers are polymers having elastomeric properties and which have a clearly defined melting point and crystallization point and are consequently processable in the molten phase and, inter alia, can be moulded by injection moulding and extrusion.

BACKGROUND OF THE INVENTION

Copolyesters derive this combination of properties from the molecular structure of the linear chains composed of hard segments having crystalline properties and soft segments having elastic properties. For a good serviceability, the hard segments should have a melting point which is at least higher than 100°C., preferably higher than 150° C. and still more preferably higher than 175° C. To retain elastic properties at lower temperatures, the soft segments have a glass transition temperature of less than 20° C., preferably less than 0° C. and still more preferably less than −20° C.

In the conventional thermoplastic copolyester elastomers according to the prior art, which has been extensively described, inter alia, in Encyclopedia of Polymer Science and Engineering, Vol. 12, page 75 ff. (1988) and the references listed therein, the hard segments are generally made up of units derived from an aromatic dicarboxylic acid and an aliphatic diol and the soft segments of polyester units derived from aliphatic dicarboxylic acids and aliphatic diols or from lactones or soft segments composed of aliphatic polyether units.

The conventional thermoplastic copolyester elastomers having good mechanical properties and easy processability have, however, some specific disadvantages. Thus, the copolyesters having soft polyether segments are not so good as regards thermal stability and the copolyesterester elastomers are susceptible to hydrolysis.

The subject of the invention is a copolyester elastomer which has both superior thermal oxidative stability and stability towards hydrolysis.

SUMMARY AND OBJECTIONS OF THE INVENTION

The inventors have succeeded in finding such a copolyester elastomer which is essentially made up of:

A) hard polyester segments made up of repeating units derived from an aliphatic diol and an aromatic dicarboxylic acid, B) soft polyester segments made up of repeating units derived from B1) an aliphatic carbonate and, if desired, up to 60% by weight of B, B2) an aliphatic diol and an aliphatic dicarboxylic acid or B3) a lactone, wherein the hard and soft segments are bonded via ester bonds to form copolyesterester units and the copolyesterester units are joined to one another by C) a urethane group having the formula $R[NHC]_p$ where $p=2$ or 3 and $R_1=$an alkyl, aryl or aralkyl group.

While retaining the good mechanical properties, such as tensile strength and tension set, the copolyester elastomer of the invention has a superior thermal stability and resistance to hydrolysis with respect to the conventional copolyester and copolyether esters. This result is very surprising because copolyesterester urethane elastomers, such as disclosed, inter alia, in EP-A-102115 and commercially available under the trade name Arnitel U® from the DSM company, have a limited resistance to hydrolysis and copolyester carbonates disclosed by A. Lila-onitkul et al., Rubber Chemistry and Technology, 50, March–April 1977, page 3 and in JP-B-95-39480 have, however, inferior mechanical properties and exhibit only a marginal improvement in the resistance to hydrolysis.

DETAILED DESCRIPTION OF THE INVENTION

The repeating ester units of the hard polyester segments A are derived from at least one aromatic dicarboxylic acid and at least one aliphatic diol. Suitable aromatic dicarboxylic acids are, inter alia, acids selected from the group comprising isophthalic or terephthalic acid, naphthalenedicarboxylic acids and diphenyldicarboxylic acids. Preferably, the dicarboxylic acid is terephthalic acid, 2,6-naphthalenedicarboxylic acid or 4,4'-diphenyldicarboxylic acid. Also very suitable is a mixture of 4,4'-diphenyldicarboxylic acid and 2,6'- naphthalenedicarboxylic acid or a mixture of 4,4'- diphenyldicarboxylic acid and terephthalic acid. The mixing ratio between the two dicarboxylic acids is preferably chosen between 40:60 and 60:40 on a weight basis.

Suitable aliphatic diols for the hard segment A are, inter alia, the alkylene glycols. The number of C atoms in the alkylene radical is preferably 2–6. Ethylene glycol, propylene glycol or butylene glycol are preferred. Butylene glycol is the most preferred.

A polyester containing repeating butylene terephthalate units is the most preferred as hard polyester segments.

The soft polyester segment B is made up of repeating units derived from at least one alkylene carbonate and, if desired, up to 60% by weight of B, which is made up of repeating units derived from an aliphatic diol and an aliphatic dicarboxylic acid or repeating units derived from a lactone. The alkylene carbonate can be represented by the formula

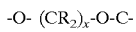

where $R=H$, alkyl or aryl, $x=2–20$. Preferably $R=H$ and $x=6$ and the alkylene carbonate is therefore hexamethylene carbonate.

The repeating units of B2) are preferably derived from an alkylenediol containing 2–20 C atoms, preferably 3–15 C atoms, in the chain and an alkylenedicarboxylic acid containing 2–20 C atoms, preferably 4–15 C atoms. Butylene adipate is preferred as repeating unit for B2). If B contains repeating units derived from a lactone, preference is given to polycaprolactone. The contents of A and B may vary within wide limits and are primarily determined by the desired mechanical properties. Thus, copolyester elastomers having a high content of A have a greater rigidity and higher melting point. On the other hand, copolyester elastomers having a high content of B are much more flexible and these materials have a lower melting point. Generally, the weight ratio A:B in the copolyester elastomer will vary between 20:80 and 90:10. Preferably between 30:70 and 80:20. The content of C is usually between 0.1 and 10% by weight, relative to A+B, preferably between 1 and 8% by weight. The content of C is usually approximately 5% by weight, relative to A+B.

Usual difunctional isocyanates are, inter alia, paratoluene diisocyanate, diphenylmethane diisocyanate (MDI), xylylene diisocyanate, hexamethylene diisocyanate or isophorone diisocyanate.

The copolyester elastomer according to the invention may be prepared, inter alia, by consecutively 1. Reacting the polyester A, an aromatic dicarboxylic acid, an aliphatic polycarbonate diol and, if desired, an aliphatic polyester or a polylactone with one another in the presence of a catalyst at elevated temperature for a limited period of time and removing any volatile reaction products formed.
2. Deactivating the catalyst completely or partially.
3. Adding a difunctional or trifunctional isocyanate to the block copolyesterester obtained under 1 and continuing the reaction.

The first reaction step is preferably carried out at a temperature between 180 and 260° C. In this reaction, the catalyst used may be one or more of the conventional catalysts which are used in the production of polyesters, for example tetrabutyl titanate and/or manganese acetate. The catalyst may already be present in the polyester A or one of the other reactants and in such a case no longer has to be added. Depending on the reaction temperature chosen and the concentration of the catalyst, the reaction time may vary between a few minutes and approximately 2 hours. At high temperature and/or catalyst concentration, the short time is preferable; at lower temperature and/or catalyst concentration, a longer time can be permitted. The limited time is chosen in order to interrupt the transesterification process in due time so that, under 1., a block copolyesterester is formed which still has a melting point which is in the order of that of the polyester A.

The average person skilled in the art will be able to determine the combination of reaction temperature, catalyst concentration and reaction time desirable for his situation by systematically experimenting. The polyester A generally has a number-average molecular weight between 5000 and 35000, and the aliphatic polycarbonate diol can have a molecular weight between approximately 500 and 5000, preferably between 800 and 3000. The aliphatic polyester diol or the polylactone diol has a molecular weight which is preferably of the same order as that of the aliphatic carbonate diol.

The abovementioned diols may contain minor quantities of higher polyols. Higher functional compounds, for example trimethylol groups, can also be used in the synthesis of the polyester A, or such compounds may additionally be present in the reaction mixture under 1. The deactivation of the catalyst specified under 2 is carried out by conventional means for the purpose. Tetrabutyl titanate may, for example, be deactivated in an excellent manner with an equivalent amount of a phosphorus compound, for example, orthophosphorous acid, phosphoric acid, triphenyl phosphite, triphenyl phosphate, tristriethylene glycol phosphate or carbethoxymethyl diethyl phosphonate. Deactivation is preferably carried out in the melt of the block copolyester; the period of time necessary for this purpose is generally short and in the order of 5 minutes, after which the diisocyanate, which may contain, if desired, some monoisocyanate and triisocyanate, is added to the melt. The amount of diisocyanate added is generally such that the NCO:OH ratio =approximately 1, where OH stands for the amount of hydroxyl terminal groups in the block copolyester obtained from 1 and NCO stands for isocyanate group.

The progress of reaction step 3 can readily be followed by measuring the melt viscosity of the reaction mixture with the aid of the torque of the stirring device which is normally used to obtain good mixing of the isocyanate with the block copolymer. When a maximum torque on the stirrer is reached, the reaction is complete and, if desired after having removed to a still greater extent volatile constituents from the reaction mixture, the copolyester elastomer of the invention can be removed from the reactor.

The copolyester elastomer according to the invention may furthermore contain the conventional additives and fillers, for example stabilizers, dyes and pigments, processing aids, for example mould-release agents, nucleating agents, flame retardants and fillers.

Suitable thermo-oxidative stabilizers are, for example, sterically hindered phenols or secondary amines; polyphenols containing amides are very suitable. Hindered phenols are, for example, Irganox® 1010, Irganox® 1330 and Irganox® 1098 from the Ciba-Geigy company. A much used amine is Naugard® 445 from the Uniroyal company.

Flame retardants to be used are, inter alia, melamine, melamine condensates and melamine compounds, for example melam, melamine phosphate and melamine cyanurate and halogenated organic compounds, for example polybromostyrene. The use of halogen-free compounds, preferably melamine cyanurate, is preferred, particularly for electrical applications. Preferably, fillers are used in minor amounts, that is to say less than 50% by weight of the total composition. Fillers are, for example, carbon black, talc and clay. In some applications, the use of (glass) fibre reinforcement offers specific advantages.

The copolyester elastomer according to the invention can be shaped by the usual shaping techniques from the melt, for example by means of injection moulding, flat-film extrusion, extrusion blow moulding, coextrusion.

Applications in which the copolyester elastomer according to the invention has particular advantages over the conventional polyester elastomers are, inter alia, pipes, hoses, cable sheaths, in particular for applications in the automobile sector, bellows and seals.

The invention is now explained in greater detail by reference to the following examples and comparative experiments, without being limited thereto.

Experiment 1 (Comparative Example A)

476 g of polyhexamethylene carbonate diol (Desmophen® 2020 E Schuppen from Bayer), 388 g of dimethyl terephthalate and 217 g of butanediol were heated with 194 mg of tetrabutyl titanate in a glass reactor. Methanol was distilled off in the temperature range from 150° C. to 210° C. under reduced pressure, a minimum of approximately $20 \cdot 10^3$ Pa. Heating was then carried out further to 242° C. and 1,4- butanediol was distilled off at a pressure of $0.1–0.2 \cdot 10^3$ Pa. Polymerization was continued for a further 100 minutes after the beginning of the polymerization at approximately 225° C. and $0.2 \cdot 10^3$ Pa. The copolyester obtained has a melting point of 48° C. and is very difficult to crystallize. The elastomeric properties, inter alia, tension set are inferior.

Experiment 2

(Examples I and II, Comparative Examples B, C and D)

Polybutylene terephthalate having a number-average molecular weight of 16500 was synthesized in a glass 1 liter autoclave under the conditions stated under Experiment 1 from 394 grams of dimethyl terephthalate, 278 grams of butanediol and 160 mg of tetrabutyl titanate. 0.4 mmol of TEGPA (tristriethylene glycol phosphate) were then added to the molten reactor contents and stirring was carried out for 20 minutes. The amount of polyhexamethylene carbonate diol (Examples I and II) and, if desired, polybutylene adipate diol (Example II and Comparative Example B) needed for the desired composition was then added and reaction was carried out for 35 minutes at 220–240° C. Then 300 mg of TEGPA were again added and, after stirring for 5 minutes, 39.4 grams of 1-MDI (Isonate® M143 from the Dow company). The reaction was continued until a maximum torque was reached on the stirrer. The reactor was then degassed at approximately $10 \cdot 10^3$ Pa and the reactor contents were then drained off and, after cooling, cut up to form granules. Small plates were pressed from the granules obtained to determine the resistance to hydrolysis and the thermo-oxidative stability and some physical properties. The results of this are listed in Table 1. The experiments were repeated with polycaprolactone diol instead of polyhexamethylene carbonate diol (comparative Example C).

TABLE 1

| | | $T_m$ °C. | $T_c$ °C. | $T_g$ | Res. to hydr. hours | Ox. stab. % |
|---|---|---|---|---|---|---|
| B | PBT/PBA/U 62.5/37.5 | 203 | 140 | −3 | 48 | 38 |
| 1 | PBT/PHMC/U 62.5/37.5 | 199 | 134 | −13 | >>216* | 64 |
| 2 | PBT/PBA/PHMC/U 62.5/18.75/18.75 | 181 | 121 | −20 | 150 | 50 |
| C | PBT/PCL/U 62.5/37.5 | 204 | 164 | −6 | 48 | 1**) |
| D | ARNITEL E 55 ® | 202 | 165 | −45 | 550 | 1**) |
| E | Pelprene S2002 ® | 212 | 167 | −25 | 145 | 1**) |

*The retention of the elongation at break was still 123% after 216 hours.
**The material was brittle.
The U content was approx. 5% by weight of (PBT + soft segments) in all cases.

Key to abbreviations: PBT; polybutylene terephthalate, $T_m$=225° C. PBA; polybutylene adipate, $T_m$=55° C., $T_g$=−68° C. U; urethane groups derived from 1-MDI, Diphenylmethane diisocyanate, Isonate® M143, from Dow PHMC; polyhexamethylene carbonate PHMC 2000 Desmophen®2020 from Bayer, $T_m$=62° C., $T_g$=−47° C. PCL; polycaprolactone, PCL 2000 from Solvay Chem., $T_m$=60° C., $T_g$=−65° C. ARNITEL® E55; copolyether ester based on PBT and polytetramethylene oxide having a Shore D hardness of 55, corresponding to the other compositions in Table 1, from DSM. Pelprene S2002®; copolyesterester based on polybutylene terephthalate and polycaprolactone, product of Toyobo, Japan.

The resistance to hydrolysis was determined as the time at which, when immersed in boiling water, the elongation at break dropped below 50% of the original value. The value for ARNITEL E55 is derived from the relevant product brochure.

The copolyester elastomers according to the invention exhibit an important improvement in the resistance to hydrolysis compared with the other copolyesterester compositions known from the prior art.

The thermo-oxidative resistance was determined as the retention of the elongation at break after exposure for 125 days in an oven at a temperature of 150° C. with air circulation.

The melting point, $T_m$, and the crystallization temperature $T_C$ were determined by differential scanning calorimetry (DSC) with a scanning rate of 10° C./min.

The glass transition temperature, $T_g$, was obtained from the torsion damping measurements (DMTA).

In parallel with the abovementioned measurements, the relative solution viscosity of the tested samples was determined in m-cresol; it was found that the decrease in mechanical properties proceeded in parallel with the decrease in relative viscosity. For a relative viscosity of approximately 1.6 and lower, there is a very severe decrease in the mechanical properties. In subsequent tests, therefore, the pattern of the relative viscosity decrease was taken as a measure of the resistance to hydrolysis. Below a value of approximately 1.6 for the relative viscosity, the retention value of 50% for the mechanical properties is usually transgressed.

Experiment 2

In this experiment, granules of a number of copolyester elastomers have been immersed in water at 80° C. and the variation in the relative viscosity has been measured as a function of time. Table 2 gives the results for the various copolyesters (days before $\eta_{rel}$=1.6 is reached).

TABLE 2

Susceptibility to hydrolysis of various copolyester elastomers at 80° C. in water.

| Copolyester elastomer | Days | initial $\eta_{rel.}$ |
|---|---|---|
| PBT/PBA/U 62.5 37.5 | 16 | 3.20 |
| PBT/PBA/U*) 62.5 37.5 | 33 | 2.89 |
| PBT/PBA/PHMC/U 62.5 18.75 18.75 | 60 | 2.01 |
| PBT/PHMC/U 62.5 37.5 | 290 | 2.29 |
| Pelprene ® S2002 | 45 | 2.56 |
| Arnitel ® E55 | 100 | 2.80 |

*)Stabilize with 1.6% by weight of Stabaxol® P100, a poly(carbodiimide) from the Rheinchemie company.

Experiment 3

The oil resistance in ASTM3 oil at 100° C. of a number of copolyester elastomers from the preceding experiments was determined on ISO 2 test rods (2 mm). The results are as follows as regards the retention of the tensile strength and the increase in volume after an exposure lasting 4 weeks.

| | Retention of tensile strength [%] | Increase in volume [%] |
|---|---|---|
| Arnitel ® E55 | 96 | 9.5 |
| PBT/PHMC/U 62.5/37.5 | 123 | 4.9 |

Experiment 4

To test the copolyester elastomers according to the invention as cable sheathing material, a fairly large amount was produced in a reactor on an approximately 50 kg scale; the reaction conditions were comparable with those of Experiment 1. The copolyester elastomers obtained had the same physical characteristics as those in Table 1.

The copolyester elastomers have been applied to 0.5 mm² wires as a 0.3 mm thick sheathing. Generally, it was possible to process the compositions without problems at a rate of 500 m/min on a laboratory cable line. The sheathed wires have then been subjected to the following tests:

1. Resistance to hydrolysis at 80° C. in water vapour (99% relative humidity).

Sheathed cables aged under the abovementioned conditions with various exposure times were wound around a mandrel (diameter corresponding to the wire diameter). An electrical voltage difference of 1000 volts was then applied for 30 minutes to these wound cables. The electrical resistivity was calculated on the basis of the measured electrical leakage current. The voltage difference was then increased to 5000 volts within a few seconds. The criterion is electrical breakdown or no electrical breakdown (DIN standard 72551).

Table 3 shows the results for a number of copolyester elastomers.

TABLE 3

Hydrolysis test at 80° C. in water vapour.
Winding test with electrical voltage after aging.

| | Days until electrical breakdown | Electrical resistivity (Ohm·cm) |
|---|---|---|
| PBT/PBA/U 62.5/37.5 | 14 | >10$^{10}$ |
| PBT/PBA/PHMC/U 62.5/18.75/18.75 | 24 | >10$^{10}$ |
| PBT/PHMC/U 62.5/37.5 | >54 | >10$^{10}$ |
| PBT/PBA/U* 62.5/37.5 | 20 | >10$^{10}$ |
| Pelprene S2002 ® | 20 | >10$^{10}$ |

*)Stabilized with poly(carbodiimide) (Stabaxol ®)

2. Thermo-oxidative resistance at 150° C. in ambient air (23° C., 50% RH).

Sheathed cables aged under the abovementioned conditions with various exposure times were wound onto a mandrel (diameter corresponding to the wire diameter). An electrical voltage difference of 1000 volts was then applied to these wound cables for 30 minutes. The voltage difference was then increased to 5000 volts within a few seconds. The criterion is: breakdown or no breakdown. Table 4 shows the results for a number of copolyesters.

TABLE 4

Thermo-oxidative ageing test at 150° C. in ambient air (23° C., 50% RH). Winding test with electrical voltage after ageing

| | Hours until electrical breakdown | Electrical resistivity (Ohm·cm) |
|---|---|---|
| PBT/PBA/U 62.5/37.5 | >3000 | >10$^{10}$ |
| PBT/PBA/PHMC/U 62.5/18.75/18.75 | >3000 | >10$^{10}$ |
| PBT/PHMC/U 62.5/37.5 | >3000 | >10$^{10}$ |
| PBT/PBA/U* 62.5/37.5 | >3000 | >10$^{10}$ |
| Pelprene S2002 ® | >3000 | >10$^{10}$ |

*Stabilized with poly(carbodiimide) (Stabaxol ®, 1.6% by weight)

3. Tensile properties

Some tensile properties of a number of copolyester elastomers were measured on stripped cable coatings (i.e. after removal of the copper core). The results reported are stated in Table 5.

TABLE 5

Tensile properties of some copolyester elastomers.

| | Elongation at break (%) | Breaking stress (MPa) |
|---|---|---|
| PBT/PBA/U 62.5/37.5 | 690 | 36 |
| PBT/PBA/PHMC/U 62.5/18.5/18.75 | 630 | 30 |
| PBT/PHMC/U 62.5/37.5 | 590 | 32 |

What we claim is:

1. A copolyester elastomer comprising:
   a plurality of copolyester units having,
   A: at least one hard polyester segment comprising repeating units derived from an aliphatic diol and an aromatic dicarboxylic acid; and
   B: at least one soft polyester segment comprising repeating units derived from
      B1: at least one aliphatic carbonate;
   wherein at least two said copolyester units are joined by a urethane group.

2. The copolyester elastomer according to claim 1, wherein said at least one soft polyester segment further comprises repeating units derived from,
   B2: an aliphatic diol and an aliphatic dicarboxylic acid; or
   B3: a lactone.

3. The copolyester elastomer according to claim 1, wherein said at least one soft polyester segment further comprises up to 60% by weight of repeating units derived from,
   B2: an aliphatic diol and an aliphatic dicarboxylic acid; or
   B3: a lactone.

4. A copolyester elastomer according to claim 1, wherein said urethane group has the formula

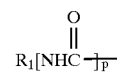

wherein
   p=2 or 3 and
   R$_1$=an alkyl, aryl, or aralkyl group.

5. A method of making a copolyester elastomer comprising: forming at least two copolyester units by,
   reacting at least one dicarboxylic acid derived from at least one hard polyester
   segment comprising repeating units derived from an aliphatic diol and an aromatic
   dicarboxylic acid with at least one diol derived from at least one soft polyester
   segment comprising repeating units derived from at least one aliphatic carbonate, in the presence of a catalyst; and
   reacting at least two said copolyester units with a difunctional or trifunctional isocyanate to form said copolyester elastomer.

6. The copolyester elastomer according to claim 1, wherein said dicarboxylic acid is selected from the group consisting of isophthalic or terephthalic acid, naphthalenedicarboxylic acids, diphenyldicarboxylic acids or a mixture of 2 or more thereof.

7. The copolyester elastomer according to claim 6, wherein said dicarboxylic acid is terephthalic acid.

8. The copolyester elastomer according to claim 6, wherein said aromatic dicarboxylic acid is a mixture of 2, 6-naphthalenedicarboxylic acid and 4,4'-diphenyldicarboxylic acid.

9. The copolyester elastomer according to claim 6, wherein said aromatic dicarboxylic acid is a mixture of 4, 4'-diphenyldicarboxylic acid and terephthalic acid.

10. The copolyester elastomer according to claim 1, wherein said at least one hard polymer segment comprises an aromatic dicarboxylic acid and a diol selected from the group consisting of alkylene glycols containing 2–6 carbon atoms in the alkylene radical or a mixture of 2 or more thereof.

11. The copolyester elastomer according to claim 10, wherein said at least one hard polyester segment comprises repeating units of butylene terephthalate.

12. The copolyester elastomer according to claim 1, wherein B1 is an alkylene carbonate having the formula -O-(CR$_2$)$_x$-O-C- where R$_2$=H, alkyl or aryl radical, and x=2–20.

13. The copolyester elastomer according to claim 12, wherein said alkylene carbonate is hexamethylene carbonate.

14. The copolyester elastomer according to claim 2, wherein said soft polyester is derived from an alkylenediol containing 2–20 C atoms in the chain and an alkylenedicarboxylic acid containing 2–20 C atoms in the chain.

15. The copolyester elastomer according to claim 14, wherein said soft polyester is derived from butylene adipate.

16. The copolyester elastomer according to claim 2, wherein said soft polyester is derived from caprolactone.

17. The copolyester elastomer according to claim 4, wherein the urethane group comprises a compound selected from the group consisting of 4, 4'- diphenylmethane diisocyanate, toluene diisocyanate, xylylene diisocyanate, hexamethylene diisocyanate and isophorone diisocyanate.

18. A copolyester elastomer comprising:
   a plurality of copolyester units having,
   A: at least one hard polyester segment comprising polybutylene terephthalate, and
   B: at least one soft polyester segment comprising: repeating units derived from,
   B1: polyhexamethylene carbonate, and, optionally,
   B2: polybutylene adipate,
   wherein at least two said copolyester units are joined by a urethane group derived from 4,4'-diphenylmethane diisocyanate.

19. A flame retardant copolyester elastomer composition comprising at least one copolyester elastomer according to claim 18 or 1 and at least one compound selected from the group consisting of melamine, melamine condensates and melamine compounds.

20. The flame retardant copolyester elastomer composition according to claim 19, wherein said melamine compound is melamiine cyanurate.

21. A shaped article entirely or partially composed of the copolyester elastomer according to claim 18 or 1.

\* \* \* \* \*